United States Patent [19]

Vonier

[11] Patent Number: 5,570,942
[45] Date of Patent: Nov. 5, 1996

[54] UNDER-BOTTOM GUIDE FOR PULL-OUT DRAWERS

[75] Inventor: Stefan Vonier, Schruns, Austria

[73] Assignee: Fulterer Gesellschaft M.B.H., Lustenau, Austria

[21] Appl. No.: 500,158

[22] Filed: Jul. 10, 1995

[30] Foreign Application Priority Data

Jul. 27, 1994 [AT] Austria .................... 1489/94

[51] Int. Cl.⁶ .......................... A47B 88/04; A47B 88/10
[52] U.S. Cl. ........................... 312/334.6; 312/334.1; 384/19
[58] Field of Search .............. 312/330.1, 334.1, 312/334.7, 334.8, 334.12, 334.14, 334.15, 334.22, 334.6; 384/18–23

[56] References Cited

U.S. PATENT DOCUMENTS

| | | | |
|---|---|---|---|
| 3,278,250 | 10/1966 | Vogt | 312/334.12 |
| 4,436,357 | 3/1984 | Röck et al. | 312/334.12 |
| 5,344,227 | 9/1994 | Röck et al. | 312/334.6 |

FOREIGN PATENT DOCUMENTS

| | | | |
|---|---|---|---|
| 620993 | 10/1994 | European Pat. Off. | 312/334.1 |
| 4312425 | 10/1994 | Germany | 312/334.1 |
| 5-123227 | 5/1993 | Japan | 312/334.6 |

Primary Examiner—Peter M. Cuomo
Assistant Examiner—Robert J. Sandy
Attorney, Agent, or Firm—Anderson, Kill, Olick, P.C.

[57] ABSTRACT

An under-bottom guide for pull-out drawers and including a support rail attachable inside of a furniture body, at least one support roller provided at the vertical web portion of the support rail, which is spaced from a side wall of a furniture body, a pull-out substantially U-shaped rail opening toward the base web of the support rail, and at least one pair of travelling rollers secured at a rear end of the pull-out rail adjacent to facing each other inner sides of the two vertical legs of the pull-out rail and enclosing the vertical web portion of the support rail therebetween, with one of the travelling rollers travelling exclusively along the base web and another one of the travelling rollers travelling along a horizontal flange provided at an upper end of the vertical web portion of the support rail.

4 Claims, 2 Drawing Sheets

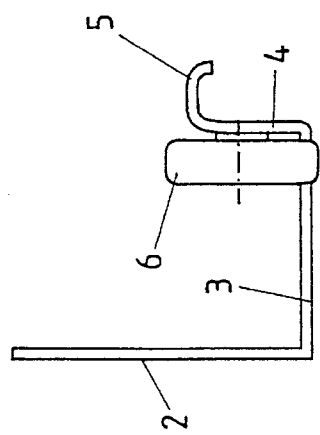
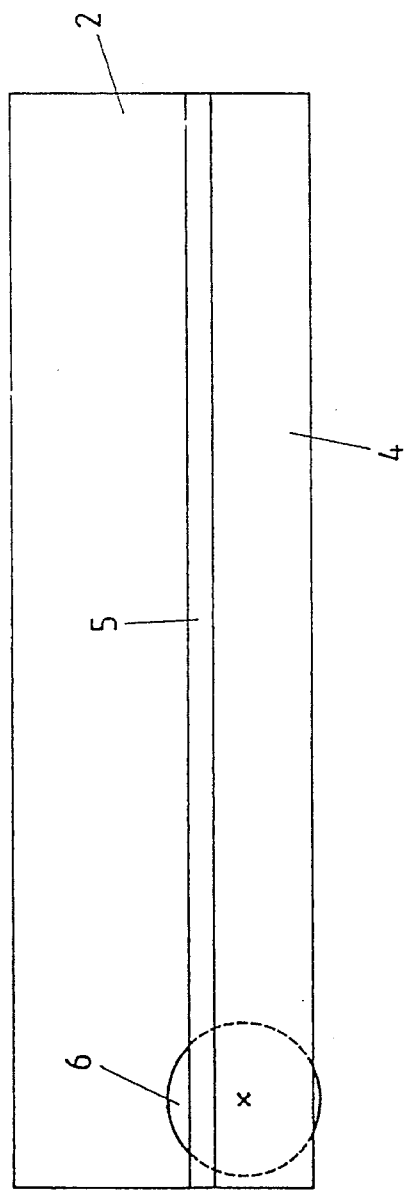
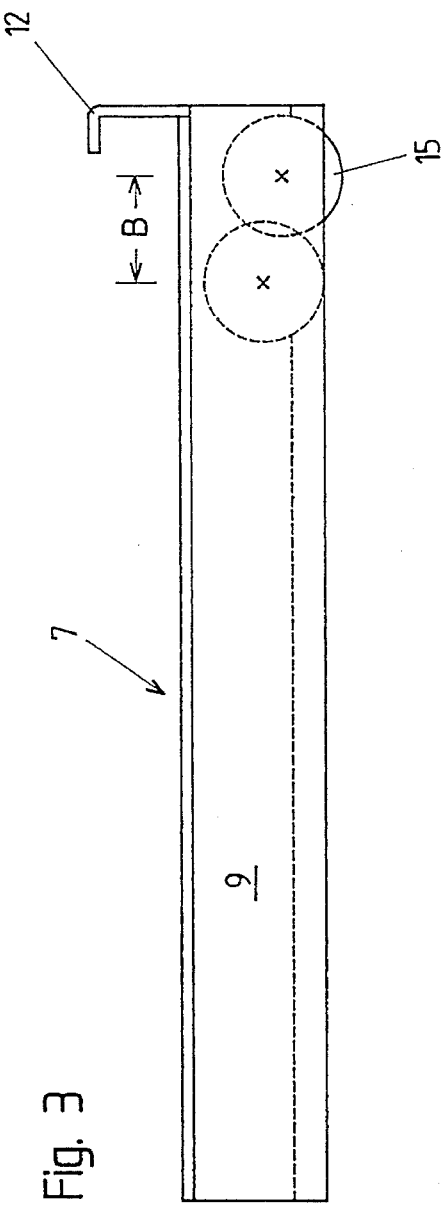
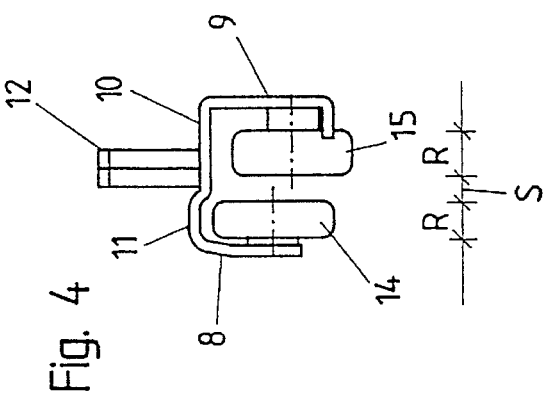

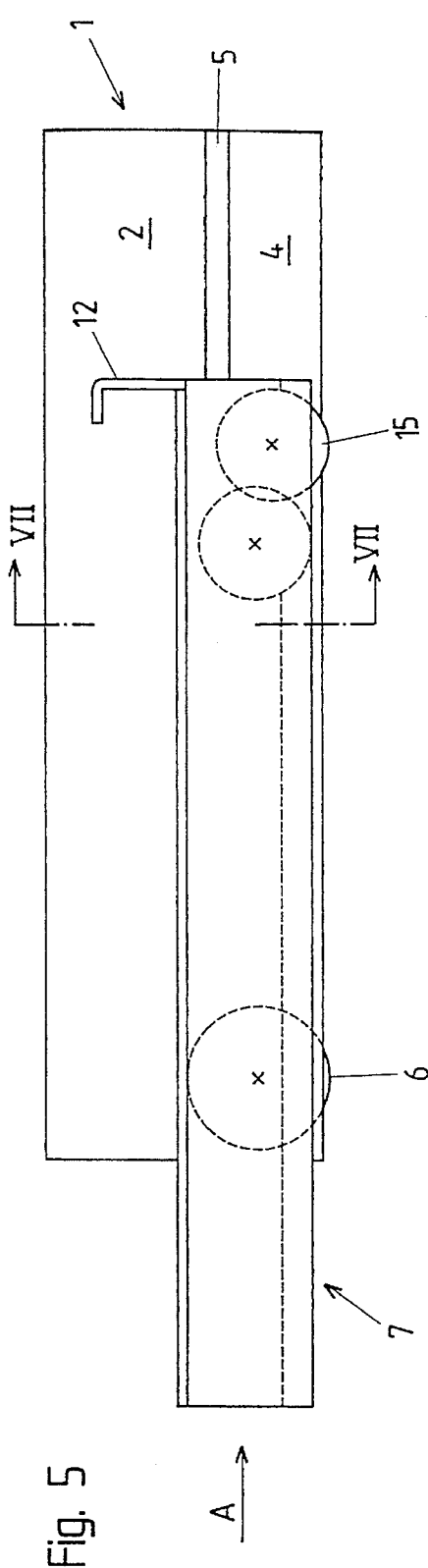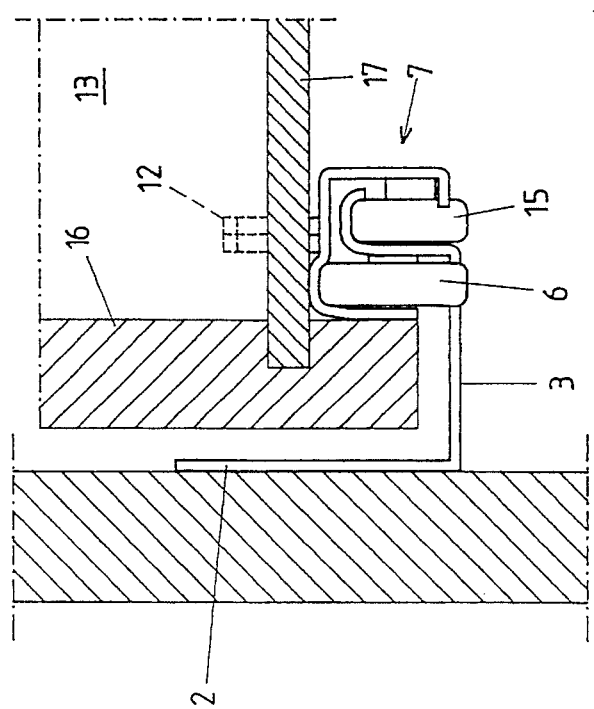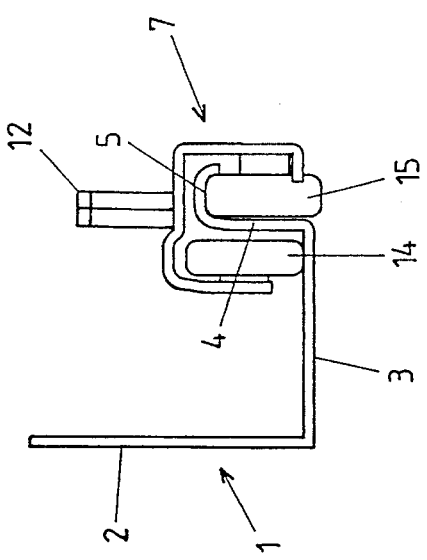

UNDER-BOTTOM GUIDE FOR PULL-OUT DRAWERS

BACKGROUND OF THE INVENTION

The present invention relates to an under-bottom guide for pull-out drawers which includes a support rail attachable inside of a furniture body and having a substantially horizontally extending base web and a vertical web portion extending upwardly at an end of the base web remotely from a wall of the furniture body, at least one support roller provided at the vertical web portion, a pull-out substantially U-shaped rail opening toward the base web and having two spaced vertical legs connected by a substantially horizontal section, and at least one pair of travelling rollers secured at a rear end of the pull-out rail adjacent to facing each other inner tides of the two vertical legs.

A pull-out guide of this type is known from the DEPS 39 41 488. In this previously known design, a rolled section having an I-shaped cross section is used to form the support rail, the internal height of which defines the diameter of the travelling rollers provided in pairs at the pull-out rail. Since the forces to be transmitted by travelling rollers are not inconsiderable in such drawer guides, there is a tendency to use travelling rollers with as large a diameter as possible. As a consequence, the possibility of keeping the construction height of the drawer guide as small as possible is very limited in this previously known design.

An under-bottom guide of comparable type is also known from the AT-PS 390 553. Here, the travelling rollers disposed in pairs at the rear side of the pull-out rail are superposed and include there between a sidewisely jutting-out flange of the vertical web of the support rail. Depending upon a respective pull-out distance and the distribution of the weight in the drawer, the bottom travelling roller presses upwards or the top travelling roller downwards. This loading change occurs periodically during the retraction and pull-out of the drawer. The disposition of the travelling rollers in pairs requires an appropriate constructional height which is two times larger than the diameter of the travelling rollers. Therefore, the drawer must be shorter than it would have otherwise been possible in accordance with the depth of a respective cavity of the furniture body so that the travelling roller can be accommodated in the furniture body of this known design. Alternatively, the travelling roller arrangement must be housed inside the drawer itself, for which purpose the drawer would have to be equipped with adequate recesses and bulges.

Accordingly, the object of the invention is to avoid these disadvantages of the known under-bottom guides.

SUMMARY OF THE INVENTION

These and other objects of the invention, which will become apparent hereinafter, are achieved by providing an under-bottom guide of the above-described type in which one travelling roller travels exclusively along the base web and another one of a pair of travelling rollers travels along the horizontal flange extending sidewisely of the vertical web of the support race, and in which the travelling rollers of the pair of travelling rollers are offset relative to each other in a pull-out direction by a distance equal to at least the radius of the travelling rollers.

The novel features of the invention permit to limit the constructional height of the under-bottom drawer guide to the height of the rails, which permits to utilize the furniture body depth in its entirety. The height of the vertical web of the support rail is in this case smaller than the diameter of the travelling rollers. In accordance with the invention, one travelling roller projects downwardly relative to the vertical web of the support rail, whereas the other travelling roller projects beyond the vertical web of the support rail upwardly. This results from different tasks the travelling rollers must fulfill. One travelling roller supports the pull-out rail, as it is pulled out, while the other supports the rail, when it is retracted.

BRIEF DESCRIPTION OF THE DRAWINGS

The objects and features of the present invention will become more apparent, and the invention itself will be best understood from the following detailed description of the preferred embodiment when read with reference to the accompanying drawings, wherein:

FIG. 1 is a side view of a support rail of an under-bottom guide according to the present invention;

FIG. 2 is a front view of the support rail shown in FIG. 1;

FIG. 3 is a side view of a pull-out rail of an under-bottom guide according to the present invention;

FIG. 4 is a front view of the pull-out rail shown in FIG. 3;

FIG. 5 is a side view of the support and pull-out rails in an operational condition thereof;

FIG. 6 is a view along arrow "A" in FIG. 5, with the elements of the furniture body and a drawer shown in cross-section; and FIG. 7 a cross-sectional view along line VII—VII in FIG. 5

DETAILED DESCRIPTION OF THE PREFERRED EMBODIMENT

The under-bottom guide according to the present invention and shown in the figures includes a support rail 1 having a vertical flange 2 for attaching the support rail 1 inside of the furniture body. The support rail 1 further includes a base web 3, which extends between the attaching flange 2 and another vertical web portion 4, at the top of which there is provided a horizontally extending flange 5 having a cross-section corresponding to the outer contour of a travelling roller 15. A drawer support roller 6 is provided at the front end of the support rail 1. The axle of the support roller 6 is fixed in the vertical web portion 4. The diameter of the support roller 6 slightly exceeds the height of the vertical web portion 4, and the support roller 6 projects, as shown in FIG. 2, beyond opposite ends of the vertical web 4 upwardly and downwardly. The support roller 6 is located adjacent to the inner side of the vertical web 4 which faces the vertical flange 2, the travelling roller supporting flange 5 being provided on the opposite outer side of the vertical web 4.

The under-bottom guide according to the present invention further includes a substantially U-shaped pull-out rail 7 which opens toward the base web 3 of the support rail 1. The pull-out rail 7 has two vertical legs 8 and 9 which are connected by a horizontal section 10 having an upwardly projecting trough-like bulge 11. The pull-out rail 7 includes a hook-shaped member 12 provided at the rear end of the pull-out rail 7 for attachment to a drawer 13. As shown in FIG. 6, the hook-shaped member 12 grips the drawer bottom 17 extending between opposite side walls 16 (only one side wall being shown in FIG. 6) of the drawer 13.

Pairs of travelling rollers 14 and 15 having the same diameter are provided in the rear portion of the pull-out rail 7, with the travelling rollers being disposed at the inner sides of the vertical legs 9 and 10 facing each other. The travelling rollers 14 and 15 are offset with respect to one another by a dimension corresponding approximately to the thickness of the sheet metal material used for fabricating the support rail 1. The width R of the two travelling rollers 14 and 15 is dimensioned in such a way that they have between them a gap S, the width of which, is somewhat greater than the thickness of the material used to fabricate the support rail 1. The inside width of the pull-out rail must also be considered when defining dimensions R and S.

When the support rail 1 and the pull-out rail 7 are operationally connected with one another, as shown in FIGS. 5, 6, 7, the trough-like bulge 11 of the pull-out rail rests upon the support roller 6 of the support rail and the pairs of the travelling rollers 14 and 15 enclose the vertical web portion 4 of the support rail 1 therebetween, with the horizontal web 3 of the support rail 1 serving as a track for the travelling roller 14 and the flange 5 of the vertical web 4 serving as a track for travelling roller 15, as shown in FIG. 7. The arrangement of such an under-bottom guide at the bottom 17 of the drawer 13 is shown in FIG. 6. Generally, two under-bottom guides, located at opposite side walls of a drawer under the drawer bottom, are used for supporting a drawer.

The support roller 6 is always under load independent of the respective pull-out position of rails 1 and 7 relative to each other. Whereas the pairs of the travelling rollers 14 and 15 are under load depending upon the pull-out position of the pull-out rail 7. The travelling roller 14 carries the load when the drawer 13 or pull-out rail 7 is pulled inward. If the pull-out rail 7 is drawn out the travelling roller 15 carries the load.

Due to this realization of the under-bottom guide, the entire depth of a furniture body or a chest of drawers can be utilized for receiving the drawer, since the travelling rollers 14 and 15 are located within the pull-out rail 7.

Though the present invention was shown and described with reference to the preferred embodiment, various modification would be apparent to those skilled in the art and, therefore, it is not intended that the invention be limited to the disclosed embodiment and/or details thereof, and departure can be made therefrom within the spirit and scope of the extended claims.

What is claimed is:

1. An under-bottom guide for pull-out drawers, comprising:

A support rail attachable inside of a furniture body and having a substantially horizontally extending base web and a vertical web portion extending upwardly at an end of said base web remote from a wall of the furniture body, said vertical web portion having at an upper end thereof a horizontal flange extending away from said base web;

at least one support roller provided at said vertical web portion;

a pull-out substantially U-shaped rail opening toward said base web and having two spaced vertical legs connected by a substantially horizontal section; and at least one pair of travelling rollers secured at a rear end of said pull-out rail adjacent to facing each other inner sides of said two vertical legs, respectively, and having substantially the same radius;

wherein said at least one pair of travelling rollers encloses said vertical web portion therebetween, with one of said at least one pair of travelling rollers travelling exclusively along said base web and another one of said at least one pair of travelling rollers travelling along said horizontal flange, and wherein the travelling rollers of said at least one pair of travelling rollers are offset relative to each other in a pull-out direction of said pullout rail by a distance equal to at least the radius of said travelling rollers.

2. An under-bottom guide as set forth in claim 1, wherein said travelling rollers of said at least one pair of travelling rollers are offset vertically relative to each other by a distance which approximately corresponds to a thickness of sheet metal of which said support rail is made.

3. An under-bottom guide as set forth in claim 1, wherein said horizontal section of said pull-out rail has an upwardly projecting trough-like bulge 11 at a side thereof adjacent to the side wall of the furniture body, said trough-like bulge resting on said support roller.

4. An under-bottom guide as set forth in claim 1, wherein said support roller has a diameter exceeding a diameter of said travelling rollers and exceeding a length of said vertical web portion, and said supporting roller projecting beyond opposite ends of said vertical web portion upwardly and downwardly, respectively.

* * * * *